United States Patent [19]

Rosaen

[11] Patent Number: 5,462,678
[45] Date of Patent: Oct. 31, 1995

[54] AIR BLAST BACKWASH ASSEMBLY FOR FLEXIBLE FILTER DEVICE

[75] Inventor: Borje O. Rosaen, Ann Arbor, Mich.

[73] Assignee: Rosedale Products, Inc., Ann Arbor, Mich.

[21] Appl. No.: 1,080

[22] Filed: Jan. 6, 1993

[51] Int. Cl.⁶ .................................................. B01D 29/66
[52] U.S. Cl. ......................... 210/798; 55/302; 210/108; 210/410; 210/411
[58] Field of Search .......................... 210/90, 108, 410, 210/411, 412, 485, 489, 741, 791, 798, 232, 497.01, 497.1, 485; 55/301, 302

[56] References Cited

U.S. PATENT DOCUMENTS

| | | | |
|---|---|---|---|
| 3,414,129 | 12/1968 | Going et al. | 210/798 |
| 3,849,309 | 11/1974 | Morris | 210/485 |
| 4,419,240 | 12/1983 | Rosaen | 210/444 |
| 4,536,200 | 8/1985 | Reist | 55/302 |
| 4,592,848 | 6/1986 | Pabst | 210/798 |
| 4,661,131 | 4/1987 | Howeth | 55/302 |
| 4,704,210 | 11/1987 | Boze et al. | 210/497.1 |
| 4,943,379 | 7/1990 | Boze et al. | 210/798 |
| 4,970,004 | 11/1990 | Rosaen | 210/409 |
| 5,118,421 | 6/1992 | Scarano | 210/485 |
| 5,128,028 | 7/1992 | Lamort | 210/485 |

Primary Examiner—Joseph W. Drodge
Attorney, Agent, or Firm—Gifford, Krass, Groh, Sprinkle, Patmore, Anderson & Citkowski

[57] ABSTRACT

A filter device including means to produce an air actuated purge for backwashing a filter assembly including a double sieve basket having a flexible filter between the double baskets. The backwash removes caked contaminant from the filter and baskets. The purge uses only the quantity of liquid in the housing and a blast of air to backwash the filter. The pressurized air causes roiling of the liquid and accelerates the blowing through the sieve baskets and flexible filter for the backwash to remove and loosen the contaminants. The air which follows the liquid through the filter assembly further loosens and then removes the remainder of the contaminants.

10 Claims, 2 Drawing Sheets

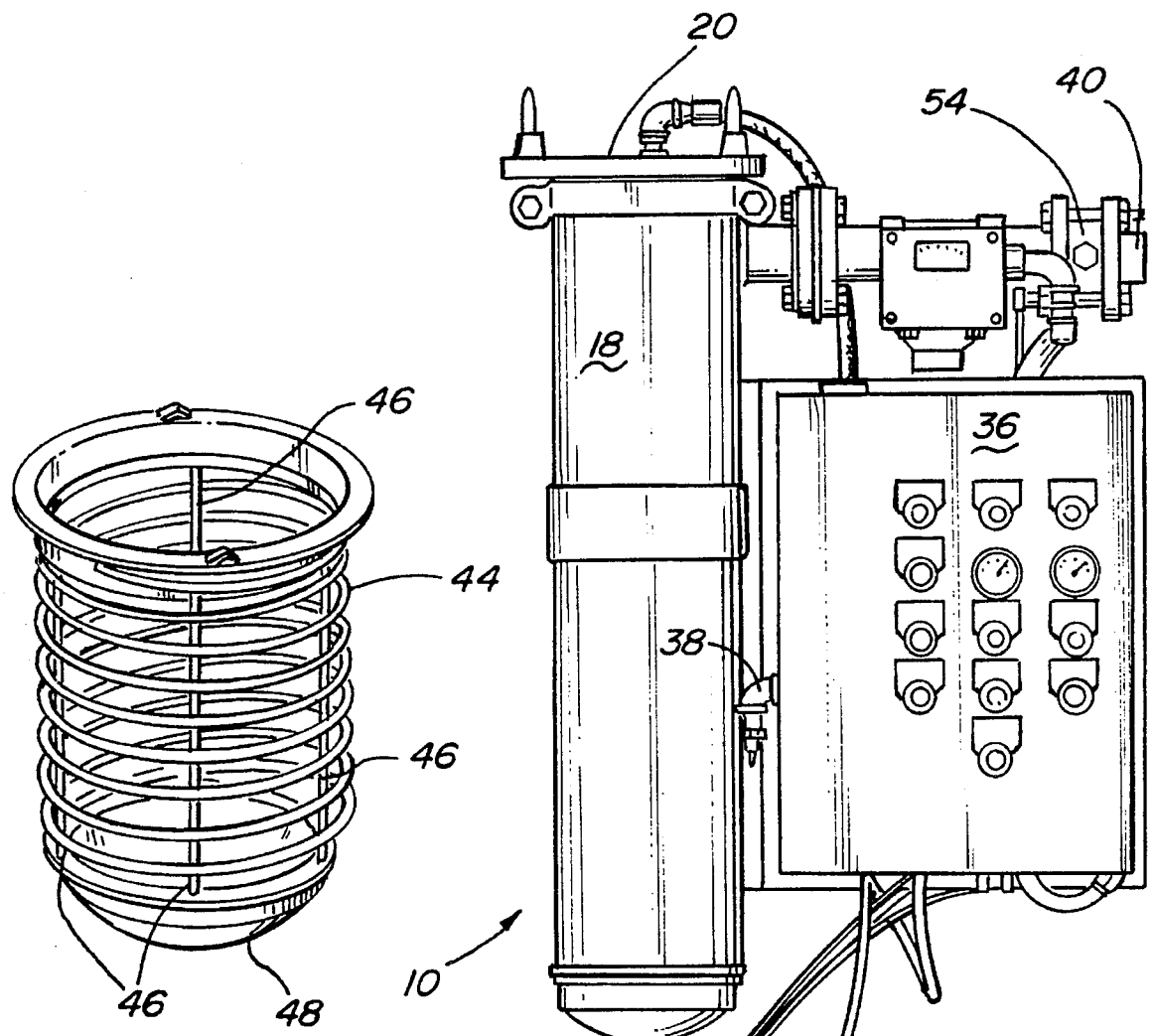
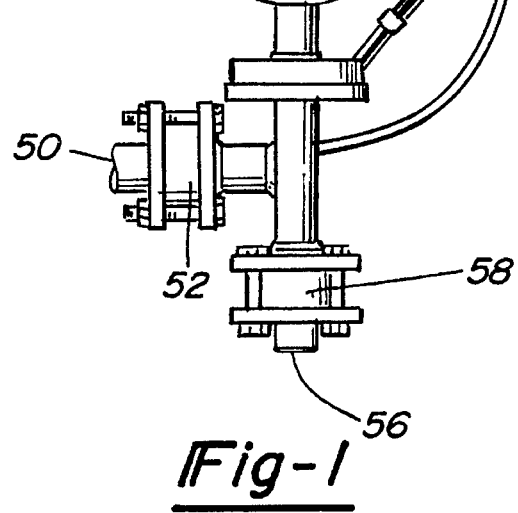
Fig-3
Fig-1

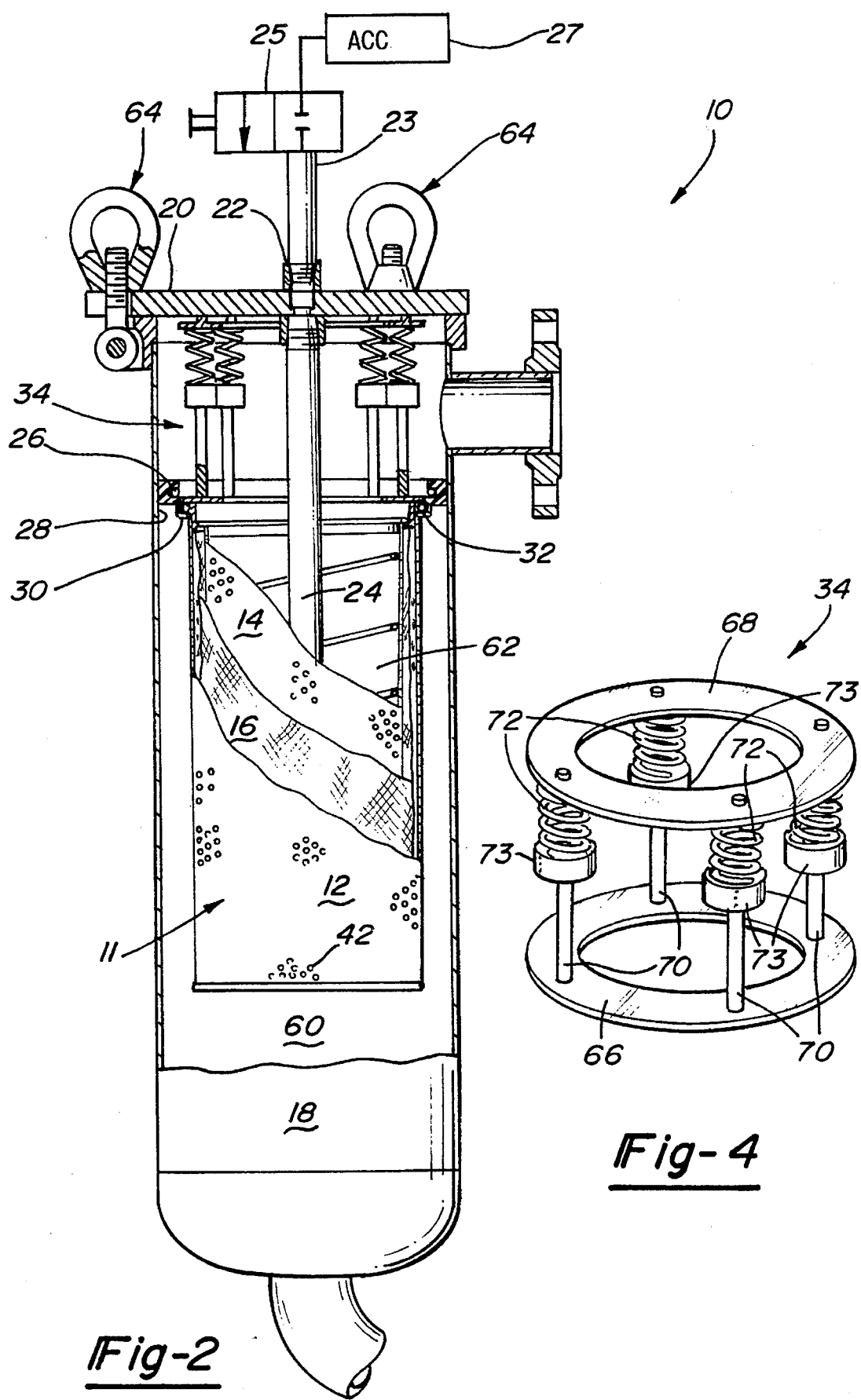

AIR BLAST BACKWASH ASSEMBLY FOR FLEXIBLE FILTER DEVICE

BACKGROUND OF THE INVENTION

I. Field of the Invention

The present invention relates to filtering of liquids, and, more particularly, relates to an air actuated purge for removing particulate during the backwashing of a double sieve basket filtering assembly and to the method of using the air actuated purge for quickly cleaning the filtering assembly and removing the backwash.

II. Description of the Prior Art

Selective filtering is used to eliminate undesirable contaminants in industrial processes. The filter elements, if they are doing the job intended to be done, will either need periodic cleaning or replacement.

The present invention is directed to a filter device having a double sieve basket filtering assembly and a means in the form of an air actuated purge using the fluid in the filter device to help dislodge the particulate cake from the surface of the filtering elements and to remove the particulate to a backwash discharge line.

When sieve baskets become blocked by particulate caked on them, either a cleaning in place can be used or else entire disassembly of the filtering unit is required. Conventionally, the cleaning in place is a reverse flow of the fluid to be filtered and removal of the reverse flow through a separate line. Some systems use an air purge to remove residual fluid into a salvage header and then backwash with an externally provided different fluid.

SUMMARY OF THE INVENTION

It is to an improved arrangement for cleaning a filter unit by backwashing using an air purge with the resident fluid without disassembling the entire filtering unit to which the present invention is directed.

The present invention is embodied in an air actuated purging means for backwashing a basket filter assembly mounted in the housing of a filter device. The filter device includes a cover for sealing the housing. The basket filter assembly includes a filter material disposed between a pair of perforated baskets. The housing wall has a seal against which the baskets are held to prevent the fluid being filtered from bypassing the sieve baskets and the filter material.

An air inlet is connected through the cover and extends into the inner sieve basket. The outer sieve basket is contained in the housing and the inner sieve basket is held inside the outer sieve basket. The flexible filter material, in the form of a filter bag of mesh or felt or other flexible material, is held in place between the two sieve baskets.

A hold down assembly is disposed between the cover and the baskets to hold the sieve baskets and the filter element together and against the seal on the housing wall.

The general flow of fluid to be filtered is achieved by pumping the fluid through an inlet line at the bottom of the filter device. A valve in the inlet line controls the flow of the fluid into an inlet chamber of the filter device. From this first chamber the fluid to be filtered passes through the outer sieve basket, through the flexible filtering bag and on through the inner sieve basket. When the fluid has passed through both the sieve baskets and the intermediate flexible filtering bag, it enters an outlet chamber in the form of filtered fluid From the outlet chamber the filtered fluid flows out of the filter device through an outlet line.

The generally cylindrical housing is closed by the cover for sealing the housing. The outlet extends horizontally through the side wall to allow the filtered fluid to flow from the outlet chamber of the filter device through an outlet line and the flow is controlled by a valve in the outlet line. A pressure switch, differential pressure switch or flow switch can be provided for activating the backwash when a pressure builds up on the inlet side, drops on the outlet side, or the flow rate decays indicating a build up of particulate on the sieve basket and the flexible filtering element.

When a clogged filter assembly has been determined by one of the three methods above, the valves in the outlet and inlet lines are closed, a valve in the backwash line is opened, and air is injected into the filter device under pressure through the air inlet line. The blast of air through the air inlet line causes the fluid in the filtering unit to flow in a reverse direction under pressure thereby forcefully removing the build up of contaminant or particulate caked on the outer sieve basket and on the flexible filtering element. The cleaning action will continue as the pressurized air passes in a reverse direction through the filter assembly. The removed contaminant is then emptied from the filtering unit through the backwash line.

Standard air line pressure from fifteen to forty P.S.I. is used for the air actuation. The air is stored in an air accumulator to insure an air quantity sufficient to purge the filter.

When the backwashing purge cycle has been completed, the connection between the source of compressed air and the filter device is closed, the valve in the backwash line is closed, and the valves in the inlet and outlet lines are opened The opening of the valve in the inlet line allows the fluid to be filtered to resume the normal flow path, to enter the inlet chamber again, pass through the outer sieve basket, through the flexible filtering element, through the inner sieve basket into the outlet chamber and out through the outlet.

The pressure switch, differential pressure, switch or flow switch can be connected with a controller to automatically close the inlet line valve and the outlet line valve and to open the valve on the backwash line and to operate the air actuated purge. After the purge cycle is completed, the controller can also reset the inlet and outlet line valves to open states as well as closing the backwash line and turning off the air flow through the air inlet. The controller can use time delay circuits and timers to control the opening and closing of the valves. In lieu of the controller, the valves can be operated manually.

The outer sieve basket can be in the form of a coiled spring welded to supports. The coiled spring has the advantageous effect of providing large openings between the coils thereby allowing the contaminant on the flexible filtering element to be removed from the filtering element without being caught on the inside of the outer sieve basket. The outer sieve basket also prevents the flexible filter element from tearing during the purging process by limiting the travel of the flexible filtering element when the blast of compressed air is used for backwashing. A perforated sieve basket can be used in place of the coiled spring basket if the cakes of contaminant removed from the flexible filtering element are generally small enough to pass through the perforations during the backwash.

The air actuated purge for backwashing of the filtering device as above described can be retrofitted to be installed in an existing filter device, by adding a backwash line if not provided, adding a pressure gauge at the outlet line to determine when backwashing is needed, by providing an air inlet into the outlet chamber of the filter device and by attaching the air inlet to a compressed air source exteriorly located from the filter device.

The foregoing advantages and others will become more apparent from the following description and the accompanying drawing.

BRIEF DESCRIPTION OF THE DRAWING

FIG. 1 is an elevational front view of a filter device of the present invention showing the housing, the inlet, outlet and backwash discharge lines, the valve housings and the control panel;

FIG. 2 is a cross-sectional view of the filter device of the present invention showing the double sieve baskets, the flexible filtering element, the seal on the interior wall of the housing, the air inlet tube, the hold down assembly to maintain the sieve baskets against the housing seal, the cover, and the valves in the inlet and outlet lines, the backwash discharge line and the air line;

FIG. 3 is a perspective fragmentary view of an alternate construction for the outer sieve basket of the filter device of the present invention using a coiled spring as the outer sieve basket; and FIG. 4 is a perspective view of the hold down assembly of the filter device of the present invention.

DETAILED DESCRIPTION OF THE PREFERRED EMBODIMENT OF THE INVENTION

Referring to FIG. 2 the filter device 10 of the invention is shown as including a double sieve basket assembly 11 which has an outer sieve basket 12, an inner sieve basket 14, and a flexible filtering element 16 which is positioned between the baskets 12 and 14. The double sieve basket 11 is mounted in a housing 18 to form the filter device 10.

As can best be seen in FIG. 2, the filter device 10 includes a cover 20 having an inlet 22. An air inlet tube 24 extends downwardly from the air inlet 22 through the cover 20 into the interior of the filtering assembly 11. An air line 23 provides air to the air inlet 22. A valve 25 in the air line 23 controls the delivery of air from an air accumulator 27 or other air source.

Still referring to FIG. 2, a seal 26 is provided on an interior wall 28 of the housing 18 with an outwardly extending double flange 30 formed on the upper edge of the outer sieve basket 12 resting on the seal 26. An upper flange 32 of the inner sieve basket 14 rests inside the flange 30 of the outer sieve basket 12. The flexible filtering element 16 is held between the flanges of the outer sieve basket 12 and the inner sieve basket 14.

A hold down assembly 34 is mounted between the cover 20 and the inner sieve basket 14. The hold down assembly 34 exerts force to keep the inner sieve basket 14 sealed against the upper edge of the filter element 16 and the outer sieve basket 12 and to urge the flange 30 of the outer sieve basket 12 against the seal 26 to keep the filter element 16 and the sieve baskets 12 and 14 in place and to prevent leakage of the fluid to be filtered around the filter element 16 when the cover 20 is attached to the housing 18.

A control panel 36 as best seen in FIG. 1 receives information from a pressure differential pressure indicator 38, or from a flow switch (not shown). A filter cake build-up on the flexible filtering element 16 will cause the pressure to increase upstream of the filter and decrease downstream of the filter and, depending on the type of pumping system, could also result in a decay in the flow rate allowing a flow switch to be used to trigger the automatic backwash.

The inner sieve basket 14 is preferably made of perforated material. The outer sieve basket 12 can be made of perforated material 42, as seen in FIG. 2, or it can be in the form of a coiled spring 44 as shown in FIG. 3. The coiled spring 44 is attached to supports 46 to form the outer sieve basket 12.

When outlet pressure has dropped due to excessive caking of contaminant on the flexible filtering element 16, a backwash operation can be manually or automatically actuated. In order to operate the backwash, an inlet line 50 is closed by closing an inlet line valve 52, and the outlet line 40 is also closed by closing an outlet line valve 54. The backwash line 56 is then opened by opening a valve 58. At this point there is fluid in the filter device on both sides of the filter assembly 11. When the backwash line valve 58 is opened, air is injected through the air inlet tube 24 into an outlet chamber 62 of the filter device 10. The injection of air under pressure through the air inlet tube 24 forces the fluid in reverse direction through the filter assembly 11, through the sieve basket 12 and 14 and the filter element 16.

The reversal of direction moves the fluid from the outlet chamber 62 through the inner sieve basket 14 through the flexible filtering element 16 and removes caked contaminant from the flexible filtering element 16. The caked contaminant that is removed from the flexible filtering element 16 passes through the perforated material 42 or spaces between the coiled spring 44 of the outer sieve basket 12 and into the inlet chamber 60 from which it is removed from the filtering unit 10 through the backwash line 56.

It has been found that the use of air to move the liquid in the reverse direction is particularly advantageous in that the liquid which is forced in the reversed direction may not be sufficient to remove all of the contaminant clogging the filter element. In such instances it has been found that the liquid flow is usually sufficient to remove a large portion of the contaminant and to loosen the remaining contaminant to such an extent that the subsequent flow of air through the filter assembly removes the remainder of the contaminant.

The cover 20 is held locked to the housing by a quick disconnect system using eye bolt assemblies 64 attached to the housing 18 to hold the cover 20 into sealing contact with the housing 18.

The hold down assembly 34 (FIGS. 2 and 4) prevents the double sieve baskets 11 from moving off the seal 26 due to the pressure of the fluid to be filtered during filtering. As can best be seen in FIG. 4, the hold down assembly 34 comprises a pair of rings 66 and 68. The first ring 66 is seated on the flange 32 of the inner sieve basket 14. The second ring 68 abuts the inside of the cover 20. Rods 70 extend from the first ring 66 towards the second ring 68, and pass through adjustment collars 73. The adjustment collars are welded to the springs 72 and the springs are welded to the second ring 68. A hole in the adjustment collar 73 allows adjusting the height of the hold down assembly 34. The hold down assembly biases the first ring 66 into engagement with the inner sieve basket 14 and the second ring 68 into engagement with the inner surface of the cover 20.

A reinforcing ring or coiled spring 74 can also be used inside the inner sieve basket 11 to prevent collapse during the filtering process.

Having described my invention, many modifications thereto will become apparent to those skilled in the art to which it pertains without deviation from the spirit of the invention as defined in the appended claims.

I claim:

1. An air actuated purge system adapted for backwashing a filtering assembly contained in a housing comprising:

an outer sieve basket disposed in said housing;

a flexible filtering element inside said outer sieve basket;

an inner sieve basket receivingly held inside said outer sieve basket with said flexible filtering element between said outer sieve basket and said inner sieve basket;

an inlet chamber between said housing and said outer sieve basket, an outlet chamber in said inner sieve basket, an air inlet tube extending into said outlet chamber, and an air accumulator connected to tube;

said outer sieve basket further comprising sealing means disposed between said inlet chamber and said outlet chamber; and support means for said filtering assembly in said housing said support means including spring means to bias said filtering assembly into engagement with said sealing means;

wherein during filtering flow, fluid being filtered enters said inlet chamber and flows through said outer sieve basket, through said flexible filtering element, and through said inner sieve basket into said outlet chamber; and wherein during purge, a backwash flow of fluid being filtered is initiated by delivering a pressurized supply of air through said inlet tube into said outlet chamber and forcing said fluid in said outlet chamber through said inner sieve basket, through said flexible filtering element inside said outer sieve basket, through said outer sieve basket into said inlet chamber, and out of said inlet chamber, said pressurized air continuing to pass through said inner sieve basket, said flexible filtering element and said outer sieve basket for a predetermined time period after the backwash flow of fluid is expelled from the housing.

2. The air actuated purge for backwashing a filtering assembly contained in a housing as claimed in claim 1 wherein said outer sieve basket is comprised of perforated material.

3. A method of backwashing a filter device, said filter device having an inner and an outer basket with a flexible filtering element retained between said baskets, said filter element being located in a housing to define an outlet chamber for a clean liquid inside of said inner basket, and an inlet chamber between said housing and said outer basket, said method comprising the following steps:

a) introducing liquid to be filtered into said inlet chamber;

b) passing said liquid through said outer basket, said filtering element, and said inner basket into said outlet chamber;

c) delivering filtered liquid from said outlet chamber out of said housing; and d) interrupting the filtering sequence of steps a, b and c then causing a blast of pressurized air to enter said outlet chamber and passing said pressurized air and the filtered clean liquid to flow in a reverse direction through said inner basket, said filtering element, said outer basket into and through said inlet chamber to flush accumulated filter cake from said filtering element and said outer basket and out of said housing to be disposed of, said pressurized air continuing to pass through said inner basket, said filtering element and said outer basket for a predetermined time period after the reverse flow of fluid is expelled from the housing.

4. A filter device for filtering fluid, said filter device comprising:

a filter housing having a filter chamber and means for closing said chamber;

said housing having an inlet and an outlet open to said chamber and filter means disposed within said chamber to filter fluid flowing through said filter means from said inlet to said outlet, said filter means comprising a first support member, a second support member, and a flexible filter element disposed between said support members; and means for producing a blast of air through said filter means in a reverse direction to the normal direction of flow through said filter means to backwash, said filter means to thereby remove contaminants from said filter means.

5. The filter device as defined in claim 4 and including means for sensing a clogged condition of said filter means and automatically operable to produce said blast of air in a reverse direction through said filter means when the filter means reaches a predetermined clogged condition.

6. The filter device as defined in claim 4 and in which said support members comprise perforated baskets.

7. The filter device as defined in claim 4 and in which said first support member comprises a perforated basket and said second support member comprises a coiled spring.

8. An air actuated purge system adapted for backwashing a filtering assembly contained in a housing comprising:

an outer sieve basket disposed in, said housing, said housing having a wall;

a flexible filtering element inside said outer sieve basket;

an inner sieve basket receivingly held inside said outer sieve basket with said flexible filtering element between said outer sieve basket and said inner sieve basket;

an inlet chamber between said housing and said outer sieve basket, an outlet chamber in said inner sieve basket, and an air inlet tube extending into said outlet chamber, and an air accumulator connected to said air inlet tube;

closure means for sealing said housing;

sealing means disposed on said housing wall;

means disposed between said closure means and said sealing means for mounting said baskets and filtering element in said outlet chamber to hold said inner sieve basket inside said outer sieve basket with said flexible filtering element between said outer sieve basket and said inner sieve basket and against said sealing means on said housing wall to prevent said fluid to be filtered in said inlet chamber from bypassing said outer sieve basket, said flexible filtering element inside said outer sieve basket, and said inner sieve basket;

wherein during filtering flow, fluid being filtered enters said inlet chamber and flows through said outer sieve basket, through said flexible filtering element, and through said inner sieve basket into said outlet chamber; and wherein during purge, a backwash flow of the fluid being filtered is initiated by delivering a pressurized supply of air through said inlet tube into said outlet chamber and forcing said fluid in said outlet chamber through said inner sieve basket, through said flexible filtering element inside said outer sieve basket, through said outer sieve basket into said inlet chamber, and out of said inlet chamber, said pressurized air continuing to pass through said inner sieve basket, said flexible filtering element and said outer sieve basket for a predetermined time period after the backwash flow of fluid is expelled from the housing.

9. The air actuated purge for backwashing a filtering assembly contained in a housing as defined in claim 8 wherein said mounting means comprises resilient means for biasing said inner sieve basket against said outer sieve basket and against said sealing means on said housing wall.

10. The air actuated purge for backwashing a filtering unit contained in a housing as defined in claim 9 wherein said resilient means comprises:

- a first ring abutting against said inner sieve basket; and a plurality of rods attached to said first ring;
- a second ring abutting said closure means; and
- a plurality of springs disposed between said second ring and said rods;
- whereby said resilient means biases said inner sieve basket against said outer sieve basket and against said seal on said housing.

* * * * *